United States Patent
Kloos et al.

(10) Patent No.: US 9,731,696 B2
(45) Date of Patent: Aug. 15, 2017

(54) METHOD FOR PRODUCING A COMBINED SERVICE BRAKE CYLINDER AND SPRING-LOADED BRAKE CYLINDER OF A VEHICLE

(71) Applicant: WABCO GmbH, Hannover (DE)

(72) Inventors: Eugen Kloos, Bensheim (DE); Frank Schrader, Isernhagen (DE)

(73) Assignee: WABCO GMBH, Hannover (DE)

(*) Notice: Subject to any disclaimer, the term of this patent is extended or adjusted under 35 U.S.C. 154(b) by 258 days.

(21) Appl. No.: 14/408,652

(22) PCT Filed: May 11, 2013

(86) PCT No.: PCT/EP2013/001401
§ 371 (c)(1),
(2) Date: Dec. 17, 2014

(87) PCT Pub. No.: WO2014/000843
PCT Pub. Date: Jan. 3, 2014

(65) Prior Publication Data
US 2015/0151731 A1 Jun. 4, 2015

(30) Foreign Application Priority Data

Jun. 26, 2012 (DE) .................. 10 2012 012 708

(51) Int. Cl.
*B60T 17/08* (2006.01)
*F16D 65/28* (2006.01)
(Continued)

(52) U.S. Cl.
CPC .......... *B60T 17/083* (2013.01); *B60T 17/088* (2013.01); *F16D 65/28* (2013.01);
(Continued)

(58) Field of Classification Search
CPC ...... B60T 17/083; B60T 17/085; F16D 65/28; F16D 65/16; F16D 65/14; F16D 2250/00;
(Continued)

(56) References Cited

U.S. PATENT DOCUMENTS

| 6,888,451 B1 * | 5/2005 | Plantan | B60T 17/085 188/1.11 E |
| 2010/0294601 A1 * | 11/2010 | Kraus | B60T 17/083 188/72.2 |
| 2014/0096677 A1 * | 4/2014 | Gaufin | B60T 17/083 92/63 |

FOREIGN PATENT DOCUMENTS

| DE | 29 36 899 | 4/1981 |
| WO | WO 2009/071229 A1 | 6/2009 |

* cited by examiner

Primary Examiner — Christopher Besler
(74) Attorney, Agent, or Firm — Leydig, Voit & Mayer, Ltd.

(57) ABSTRACT

To produce a combined service brake cylinder and spring-loaded brake cylinder for a vehicle brake system, force-actuation path characteristic curves of the brake system with the elements that can be actuated by a storage spring of the spring-loaded cylinder are measured/recorded under different operational conditions. Force-actuation characteristic curves of different storage springs for use in the spring-loaded cylinder are also measured/recorded. The minimum necessary actuation stroke of the piston of the spring-loaded cylinder and the minimum necessary spring force for a storage spring to effect a parking brake function are determined by the intersection of the force-actuation curves of the brake system with those of the storage springs. The storage spring that generates a sufficient actuation force under certain operating conditions and the dimensions resulting (Continued)

from the smallest possible piston actuation stroke are selected for producing the combined service brake cylinder and spring-loaded cylinder.

3 Claims, 2 Drawing Sheets

(51) Int. Cl.
  *F16D 121/08* (2012.01)
  *F16D 121/12* (2012.01)
  *F16D 123/00* (2012.01)

(52) U.S. Cl.
  CPC ...... *F16D 2121/08* (2013.01); *F16D 2121/12* (2013.01); *F16D 2123/00* (2013.01); *F16D 2250/0084* (2013.01); *Y10T 29/4927* (2015.01)

(58) Field of Classification Search
  CPC ......... F16D 2250/0084; F16D 2131/02; F16D 2200/0082; B23P 2700/50
  See application file for complete search history.

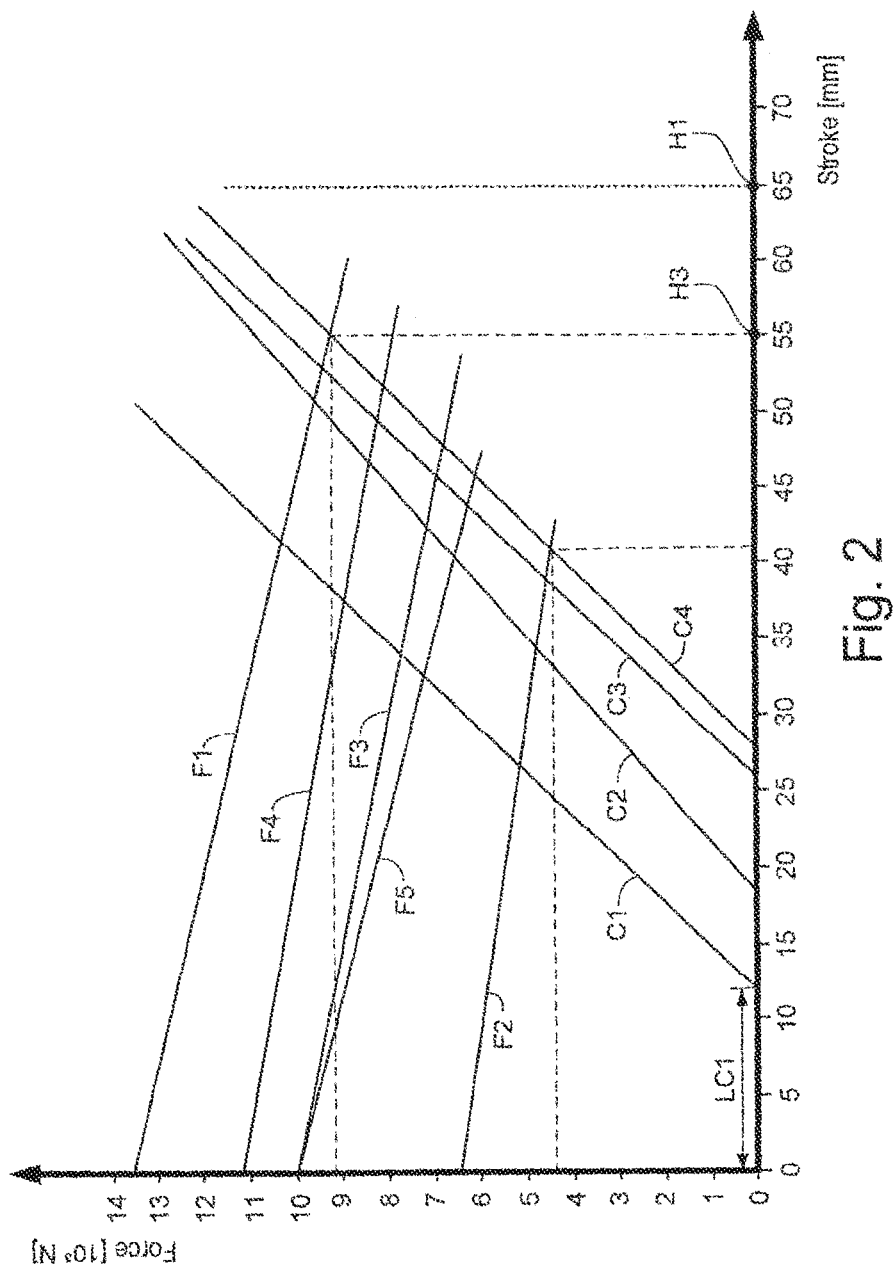

METHOD FOR PRODUCING A COMBINED SERVICE BRAKE CYLINDER AND SPRING-LOADED BRAKE CYLINDER OF A VEHICLE

FIELD OF THE INVENTION

The present invention generally relates to combined service-brake and spring-loaded brake cylinders for vehicle brake systems.

BACKGROUND OF THE INVENTION

A combined service-brake and spring-loaded brake cylinder of the general type under consideration is known from DE 29 36 899 C2, for example. In this known actuator, the service brake cylinder and the spring-loaded brake cylinder are combined to form a structural unit and are separated from one another by a partition wall. A piston is arranged in an axially movable manner within the spring-loaded brake cylinder, and a storage spring rests against one side of the piston. By means of its other axial end, the storage spring is supported against the bottom of the spring-loaded brake cylinder. An inlet opens into a pressure chamber formed between the partition wall and the piston in the spring-loaded brake cylinder. Via the inlet, a pressure medium can be introduced into the pressure chamber to move the piston in the direction of the bottom of the spring-loaded brake cylinder, compressing the storage spring in the process. If, on the other hand, the pressure in the pressure chamber of the spring-loaded brake cylinder between the partition wall and the piston is relieved upon actuation of a valve connected to the inlet, the storage spring moves the piston in the direction of the partition wall. The piston is connected to a piston rod, which extends axially through the partition wall into the region of a pressure chamber of the service brake cylinder. A seal inserted into the partition wall seals off the pressure chamber of the spring-loaded brake cylinder with respect to the piston rod. At its forward axial end extending into the region of a pressure chamber of the service brake, the piston rod carries a pressure piece. An inlet opens into the pressure chamber of the service brake. The inlet permits a pressure medium, in particular compressed air, to be introduced to actuate the service brake. This compressed air acts on a diaphragm, which is inserted within the service brake cylinder. A pressure piece in the form of a piston rod head is arranged on the side that faces away from the pressure chamber of the service brake. The piston rod head is connected to a piston rod, which extends axially out of the service brake cylinder and is connected to a brake actuating mechanism. If the service brake is actuated by introducing compressed air into the inlet, the compressed air moves the diaphragm, the piston rod head and the piston rod of the service brake such that the brake actuating parts connected to the piston rod come into effect and apply the brake of the motor vehicle. During this normal service braking, the spring-loaded parking brake remains in the inactive position, in which the storage spring remains compressed by maintenance of the pressure in the associated pressure chamber. The spring-loaded parking brake can come into effect when the service brake fails, that is, when the pressure medium connection into the inlet is interrupted or when it is to be used as an immobilization brake and acts as a parking brake when the vehicle is parked.

This known combined service-brake and spring-loaded brake cylinder is illustrated in FIG. 1 of DE 29 36 899 C2. It is apparent that this figure is an accurate drawing of the actuator and should therefore be regarded as substantially to scale. It follows from this that the maximum possible stroke of the piston of the spring-loaded brake cylinder and the maximum possible stroke of the piston of the service brake cylinder are substantially equal, and, as a result, the dimensions of the service-brake and spring-loaded brake cylinder in the longitudinal extent thereof are fixed.

In the case of known combined service-brake and spring-loaded brake cylinders, the stroke lengths of the service brake and of the spring-loaded brake are identical because the primary focus is on the apparent necessity of providing the same axial stroke for the service-brake cylinder and the spring-loaded brake cylinder in order to be able to actuate the vehicle brake with the necessary force both while driving and in a parking brake situation.

SUMMARY OF THE INVENTION

Since it is advantageous to reduce the overall size of vehicle components and save weight and ultimately production costs, it is, generally speaking, an object of the present invention to provide a method for producing a combined service-brake and spring-loaded brake cylinder having a particularly short axial length.

Depending on the operating state of the vehicle brake system, the parking brake force to be produced by the spring-loaded brake cylinder is generally lower than the service brake force. Accordingly, an axial shortening of the stroke of the piston of the spring-loaded brake cylinder and, as a result, a shortening of the axial length of the spring-loaded brake cylinder is possible as long as "worst-case scenarios" of vehicle brake operation are taken into account so as to be able to guarantee the minimum necessary parking brake force for safety reasons. On the other hand, the available installation space should not be used as the decisive parameter in determining the stroke for these very same safety reasons. Operating states that can occur as the least favorable boundary conditions during vehicle operation are to be regarded as worst-case scenarios.

Not only does the storage spring of the spring-loaded brake cylinder have an inherent actuating force variation during loading and relief, but the other mechanical actuating members of the brake system, starting with the piston of the spring-loaded brake cylinder and including the brake caliper of a disk brake, also have elastic behavior comparable with that of a spring over an actuation path. However, the onset of the spring property of these remaining brake actuating elements is dependent on overcoming a release clearance, which includes actuation paths of individual actuating members of this brake actuating system that must first be overcome without any effect on an actual braking action on the vehicle. Here, the release clearance depends, inter alia, on the coefficient of thermal expansion of the respective components and of the current component temperature.

A method for producing a combined service-brake and spring-loaded brake cylinder for a brake system of a vehicle according to an embodiment of the present invention includes:

a) in various operating states, measuring and recording force/actuation path characteristics of the brake system with all the actuating members that can be actuated by the storage spring of the spring-loaded brake cylinder, b) measuring and recording force/actuation path characteristics of different storage springs for potential use in the spring-loaded brake cylinder, c) determining the minimum required actuating stroke of the piston of the spring-loaded brake cylinder and the minimum required spring force of a storage spring for carrying out a parking brake function by means of the spring-loaded brake cylinder by ascertaining the points of intersection of the force/actuation path characteristics of the brake system with the force/actuation path characteristics of the different storage springs, d) selecting the storage spring that, in the least favorable operating state of the brake system and with a given maximum vehicle mass, produces an actuating force sufficient for carrying out a parking brake function with the smallest possible actuating stroke, and e) producing the combined service-brake and spring-loaded brake cylinder with the storage spring selected according to step d) and with the dimensions resulting from the smallest possible actuating stroke of the piston of the spring-loaded brake cylinder.

In the combined service-brake and spring-loaded brake cylinder, the service-brake cylinder is of conventional construction and the spring-loaded brake cylinder is embodied so as to be axially smaller than the brake cylinder. This is not critical since the parking brake force of a vehicle brake system is usually less than the usual service brake forces. To achieve this, a storage spring for installation in the spring-loaded brake cylinder is provided that, on the one hand, is as short as possible but, on the other hand, can produce the parking brake force necessary for reliably holding the vehicle on a downward slope with a maximum payload and unfavorably high component temperatures during a parking brake operation, even in the least favorable operating situation of the brake system.

The minimum parking brake force necessary in different operating situations can be determined from the point of intersection of the force/actuation path characteristic of a storage spring for installation in a spring-loaded brake cylinder having a force/actuation path characteristic of the remaining brake actuating elements of the brake system, the variation of the respective force/actuation path characteristic of which indicates the counterforces of an imaginary spring exerted by the other mechanical actuating members of the brake system by way of reaction upon the storage spring in the case of different actuation paths of the storage spring (action force=reaction force). These counterforces of the other mechanical actuating members or the remaining brake actuating elements of the brake system are dependent on temperature, the release clearance between the individual actuating members and the spring-elastic properties of the material.

To construct a spring-loaded brake cylinder of optimum shortness, there is accordingly a need for the storage spring, which is to be installed in the spring-loaded brake cylinder, to be relatively short and to be able to generate a sufficient actuating force as regards the parking brake force to be produced in the least favorable operating situation with a minimum actuating stroke. By means of the inventive method, it is possible to check storage springs that can produce parking brake forces of different levels against operating situations of the brake system when the parking brake function is being used in order to discover which storage spring requires a minimum possible actuating stroke in which operating situation while producing a sufficiently high parking brake force.

In one embodiment of the method according to the invention, four different force/actuation path characteristics for the remaining brake actuating elements of the brake system are included in determining a suitable storage spring that is as short as possible for the spring-loaded brake cylinder. This brake system can have disk brakes or drum brakes.

For this purpose, a first force/actuation path characteristic for the remaining brake actuating elements of the brake system is determined in advance for the state of a cold brake system with new, run-in brake pads, the effect being a small release clearance between the individual mechanical actuating members of the brake system to be actuated by the spring-loaded brake cylinder. It is furthermore to be expected that the individual mechanical actuating members of the remaining brake actuating elements of the brake system will have a relatively low elasticity owing to the relatively low temperature thereof, with the result that the force/actuation path characteristic of the remaining brake actuating elements of the brake system has a relatively steep slope.

A second force/actuation path characteristic for the remaining brake actuating elements of the brake system is determined in advance for the state of a brake system, including the brake pads and brake disks, that is hot after intensive actuation of the service brake, with the result that a larger release clearance and a larger elasticity of the actuating system can be expected, at least in the axial direction of the actuating members.

A third force/actuation path characteristic for the remaining brake actuating elements of the brake system is furthermore determined for the state of a brake system that has cooled after intensive actuation of the service brake and has been readjusted by actuation of the service brake, for which a similar slope to that for the first force/actuation path characteristic and an even larger release clearance is expected.

Finally, to assess which axially shortened storage spring is probably the best for the state of a brake system that has cooled after intensive actuation of the service brake and has not been readjusted, a fourth force/actuation path characteristic for the remaining brake actuating elements of the brake system is determined. For this, a slope similar to that for the second force/actuation path characteristic of the remaining brake actuating elements of the brake system is expected, and it will probably have the largest release clearance.

As regards the force/actuation path characteristics of storage springs that can potentially be used, it should be noted that these indicate the spring force variation over the actuation path of a respective storage spring of the spring-loaded brake cylinder, starting from an axially compressed state up to a maximum, partially relaxed state predetermined by the design.

Accordingly, the necessary spring force variation can, for example, be determined for a vehicle that is frequently used in off-road terrain with steep slopes and at relatively high component temperatures of the brake system, or alternatively for a vehicle that tends to be operated on conventional roads with relatively gentle upward slopes and at relatively low temperatures. This means that one of the parameters to be taken into account is the anticipated area of application of the vehicle, i.e., on an off-road vehicle or on a normal passenger vehicle.

It is possible to measure force/actuation path characteristics for the actuating elements of a brake system that represent the elasticity of the components included among the actuating elements, apart from the storage spring, and the dependence on the temperature of the components through the slope angle of the characteristic. These characteristics show which axial stroke has to be performed in a mechanical brake actuating system in order to produce a particular necessary braking force.

Here, the point of intersection of the force/actuation path characteristics with the stroke axis is dependent on the release clearance, which is affected by the temperature of the components and the state of release clearance readjustment at the brake cylinder. If the force/actuation path characteristics of storage springs are then entered in the same diagram for different cases of application, it is a simple matter to read off at the point of intersection of a force-actuation path characteristic of the storage springs with one of the force/actuation path characteristics of the remaining brake actuating elements of the brake system whether a predetermined braking force is achieved with a predetermined stroke of the piston of the spring-loaded brake cylinder or which stroke of the piston of the spring-loaded brake cylinder is required to produce a predetermined braking force.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The present invention is further explained below with reference to the accompanying drawings, in which:

FIG. 2 illustrates force/actuation path characteristics F1-F4 of different storage springs of a spring-loaded brake cylinder and force/actuation path characteristics C1-C4 of the remaining mechanical actuating elements of the brake system.

Figure 1:
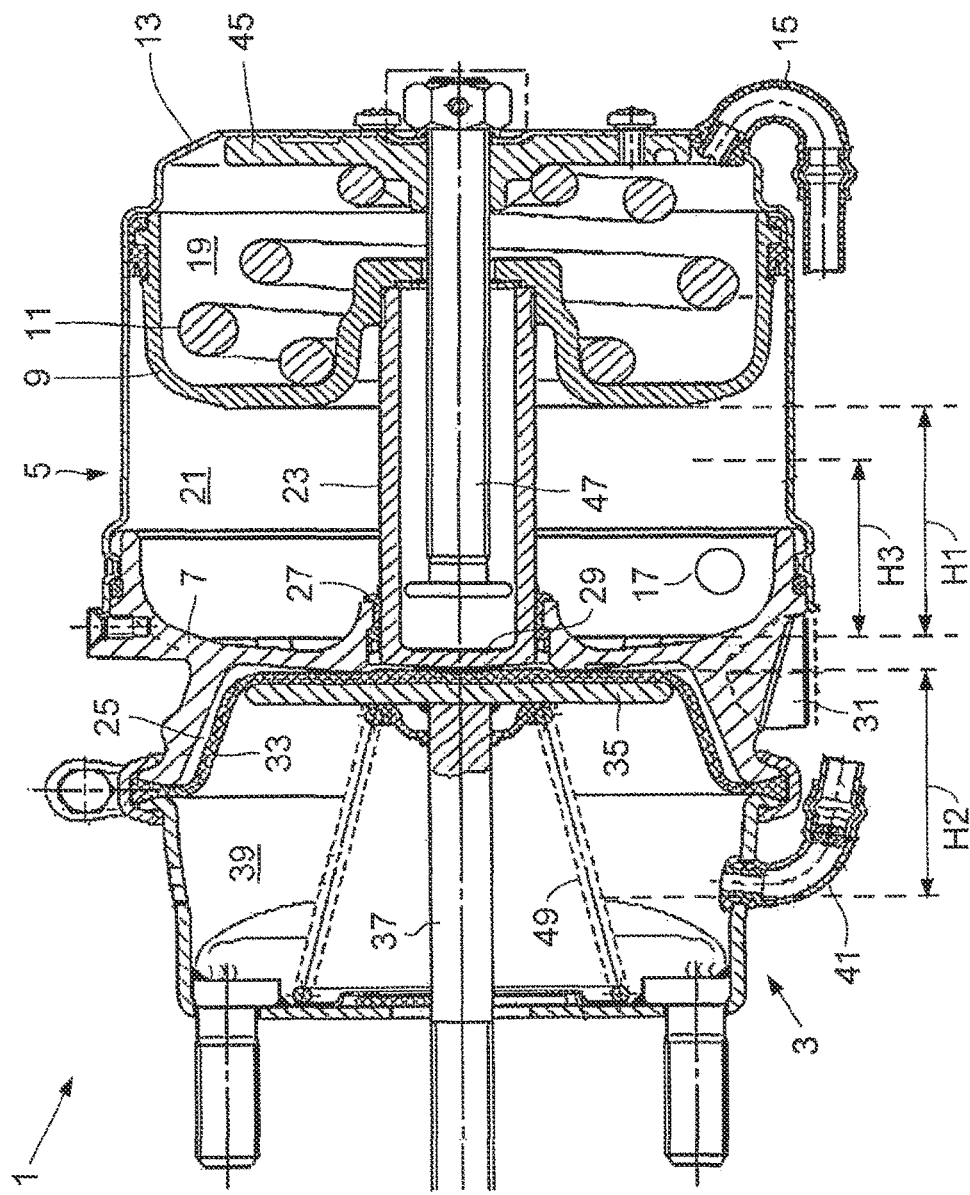
FIG. 1 is a longitudinal sectional view through a known combined service-brake and spring-loaded brake cylinder of a vehicle brake system.

LIST OF REFERENCE CHARACTERS 1 combined service-brake and spring-loaded brake cylinder
3 service-brake cylinder
5 spring-loaded brake cylinder
7 partition wall
9 piston of the spring-loaded brake cylinder
11 storage spring
13 bottom
15 vent opening
17 inlet
19 first spring chamber
21 first pressure chamber
23 piston rod of the spring-loaded brake cylinder
25 second pressure chamber
27 seal
29 pressure piece
31 inlet
33 diaphragm
35 piston rod head
37 piston rod of the service-brake cylinder
39 second spring chamber
41 vent opening
45 bottom reinforcing plate
47 release screw
49 return spring of the service-brake cylinder
H1 stroke length of the spring-loaded brake cylinder
H2 stroke length of the service-brake cylinder
H3 shortening of the stroke length of the spring-loaded brake cylinder
LC1 release clearance

DETAILED DESCRIPTION OF THE PREFERRED EMBODIMENTS

Referring now to FIG. 1, a known combined service-brake and spring-loaded brake cylinder 1 is illustrated. It has a service-brake cylinder 3 designed for a drum brake, and a spring-loaded brake cylinder 5, which are connected mechanically and separated from one another in terms of pressure by a partition wall 7. For actuation of a disk brake, there would only be a slight change in the design of the service-brake cylinder 3. A piston 9 is arranged in an axially movable manner within the spring-loaded brake cylinder 5, wherein a storage spring 11 rests against one side of the piston 9. The other axial end of the storage spring 11 is supported against a bottom 13 of the spring-loaded brake cylinder 5 via a bottom reinforcing plate 45.

Opening into a first pressure chamber 21 between the partition wall 7 and the piston 9 is an inlet 17, through which compressed air is introduced in a manner controlled by a valve (not shown) in order to move the piston 9 in the direction of the bottom 13, compressing the storage spring 11 in the process. The piston 9 is connected to a piston rod 23, which extends axially through the partition wall 7 into the region of a second pressure chamber 25 of the service-brake cylinder 3. A seal 27 inserted into the partition wall 7 seals off the partition wall 7 with respect to the piston rod 23. At its end remote from the storage spring, the piston rod 23 of the spring-loaded brake cylinder 5 carries a pressure piece 29, which rests against a diaphragm 33 of the service-brake cylinder 3 in the position illustrated in FIG. 1.

Opening into the second pressure chamber 25 formed between the diaphragm 33 and the partition wall 7 is an inlet 31, via which compressed air can be introduced in a controlled manner in order to actuate the service brake. This compressed air acts on the diaphragm 33 inserted within the service-brake cylinder 3, which acts via a pressure piece in the form of a piston rod head 35 on a piston rod 37 passed out of the service-brake cylinder 3. This piston rod 37 is connected outside the service-brake and spring-loaded brake cylinder 1 to a brake actuating mechanism. The brake actuating mechanism can be the actuating parts of a disk brake of a motor vehicle.

If the service brake is actuated by introducing compressed air into the inlet 31, the compressed air moves the diaphragm 33, the piston rod head 35 and the piston rod 37 of the service-brake cylinder 3 such that the actuating parts connected to the piston rod 37 come into effect and apply the brake of the motor vehicle. If the air pressure in the second pressure chamber 25 drops, a return spring 49 resting against the piston rod head 35 on the side facing away from the diaphragm ensures that the piston rod 37 of the service-brake cylinder 3 is pushed back in the direction of the partition wall 7.

During a normal service braking operation by means of the service-brake cylinder 3, the spring-loaded brake 5 remains in an inactive position, in which the storage spring 11 is compressed by holding the pressure in the first pressure chamber 21. If the compressed air is relieved under valve control via the inlet 17, the storage spring 11 moves the piston 9 and hence the first piston rod 23 of the spring-loaded brake 5, which is supported via the pressure piece 29 on the diaphragm 33 and thus via the piston rod head 35 on the piston rod 37 of the service-brake cylinder 3, and moves it such that the brake actuating mechanism comes into effect. In this way, the brake is actuated only by the action of the storage spring 11 and acts as a parking brake. The spring-loaded brake cylinder 5 can furthermore also be used as an emergency brake if the pressure of the medium fails.

To admit air to and release air from a first spring chamber 19 in the spring-loaded brake cylinder 5, the chamber accommodating the storage spring 11, a first vent opening 15 is provided, and a second vent opening 41 is provided in a second spring chamber 39 in the service-brake cylinder 3, the chamber accommodating the return spring 49, it being possible for the vent opening to be connected to an air filter in order to avoid sucking in contaminants during the piston or diaphragm movement.

A release screw 47 is arranged radially within the piston rod 23 of the spring-loaded brake cylinder 5, the screw serving to hold the piston 9 of the spring-loaded brake cylinder 5 in the position illustrated when the combined service-brake and spring-loaded brake cylinder 1 is to be disassembled for purposes of repair or inspection. The release screw 47 furthermore enables the piston 9 of the spring-loaded brake cylinder 1 to be held mechanically in the position shown in FIG. 1 if the compressed air supply fails.

The maximum axial actuating stroke of the piston 9 of the spring-loaded brake cylinder 5 of this known combined service-brake and spring-loaded brake cylinder 1 is indicated by the double arrow H1. This actuating stroke H1 is approximately the same size as the actuating stroke H2 of the piston 37 of the service-brake cylinder 3. According to an embodiment of the present invention, a combined service-brake and spring-loaded brake cylinder 1 is produced that manages with a shortened actuating stroke H3 of the piston 9 of the service-brake cylinder 5, with the result that it is also possible to produce the housing of the spring-loaded brake cylinder 5 in a correspondingly shortened form.

FIG. 2 is an actuating force/actuation path diagram comprising a plurality of force/actuation path characteristics C1, C2, C3, C4 of the remaining brake actuating elements of the brake system, apart from the storage spring, the characteristics being determined according to the operating situation. These characteristics are determined beforehand on the brake system. The point of intersection of each of these force/actuation path characteristics C1, C2, C3, C4 with the stroke axis is dependent on the release clearance, which is affected by the interplay between the temperature of the mechanical components in the brake actuating system, e.g., the brake caliper, brake pads, brake disk, brake actuating elements and the like, and the coefficient of thermal expansion thereof and the state of release clearance readjustment. The force/actuation path characteristics C1, C2, C3, C4 accordingly show the actuating force to be produced by the storage spring 11 of the spring-loaded brake system 5 in order to achieve the respective actuating stroke.

The force/actuation path characteristic C1 of the remaining brake actuating elements of the brake system represents the optimum state of the brake system after new brake pads have been run in. In this operating situation, the release clearance LC1 of the service-brake and spring-loaded brake cylinder 1, which is denoted once by way of example, amounts to about 12 mm.

The force/actuation path characteristic C2 of the remaining brake actuating elements of the brake system represents the state of a brake that is hot due to intensive actuation, and has a larger release clearance than a cold brake. In this operating situation, the release clearance of the brake is about 18 mm. Moreover, the slope of the force/actuation path characteristic C2 of the remaining brake actuating elements of the brake system is less for a hot brake than the force/actuation path characteristics C1 for a cold brake.

The force/actuation path characteristic C3 of the remaining brake actuating elements of the brake system represents the state of the brake system of a brake that has been cooled down after a hot state and mechanically readjusted to reduce the release clearance by actuating the service brake.

The force/actuation path characteristic C4 of the remaining brake actuating elements of the brake system represents the state of a cold brake that has cooled after a hot state and has not been readjusted mechanically by actuation of the service brake. The release clearance for characteristics C1 to C4 becomes increasingly larger in the diagram, while the slope of characteristics C1 to C4 remains the same for cold brakes and is smaller only for characteristic C2 for a hot brake.

The force/actuation path characteristics F1, F2, F3, F4 characterize four different storage springs, which have different spring constants. Thus, the storage spring with force/actuation path characteristic F1 has a very high spring force of 13,500 N in the compressed state according to FIG. 1 and, at a stroke of zero, a force that has fallen to about 9,200 N at a stroke of 55 mm.

In contrast, force/actuation path characteristic F2 has a spring force of about 6,400 N at a stroke of zero and only a spring force of about 4,500 N at a stroke of 42 mm. Force/actuation path characteristics F3, F4 and F5 are between the values of force/actuation path characteristics F1 and F2.

If a minimum required actuating force of the storage spring 11 of about 9,000 N is sufficient for a vehicle with a certain vehicle mass that is to be used in terrain with steep upward slopes and descents, and if the required stroke of the piston 9 or of the storage spring 11 in the spring-loaded brake cylinder 5 for this purpose is to be determined, it is sufficient, for example, to find the point of intersection of the force/actuation path characteristic F1 of the associated storage spring with the force/actuation path characteristic C4 of the remaining brake actuating elements of the brake system, which gives a stroke for the storage spring 11 of 55 mm and a spring force of about 9,200 N. It is thus possible, when using a storage spring 11 with force/actuation path characteristic F1, to shorten the stroke H1 of the piston 9 of the spring-loaded brake cylinder 5, the stroke being visible in FIG. 1 and FIG. 2, by 10 mm from H1=65 mm to H3=55 mm. Accordingly, the housing and the piston rod 23 of the spring-loaded brake cylinder 5 can be designed to be 10 mm shorter, thereby advantageously enabling the overall weight and overall axial length of the combined service-brake and spring-loaded brake cylinder 1 to be reduced. This furthermore advantageously reduces costs for materials and processing of the combined service-brake and spring-loaded brake cylinder.

The diagram according to FIG. 2 can also be used to check predetermined dimensions of the spring-loaded brake cylinder 5 to determine whether the spring force of a storage spring 11 of a spring-loaded brake cylinder 5 is sufficient to serve as an actuator of an immobilization brake for a vehicle in all operating states and terrain conditions. If, for example, it is assumed that a vehicle is used only on routes with gentle upward slopes and descents, the minimum necessary actuating force of the storage spring should be 4,800 N. If the combined service-brake and spring-loaded brake cylinder 1 is then to be fitted into a tight available installation space in the vehicle requiring shortening of the spring-loaded brake cylinder 5 and hence of the stroke of the storage spring 11 to 40 mm, it is possible to check by means of the diagram in FIG. 2 whether the spring force mentioned of 4,800 N can be produced with a storage spring 11 provided for this spring-loaded brake cylinder 5 and having characteristic F2 at the specified storage spring stroke of 40 mm.

The diagram in FIG. 2 shows that characteristic F2 of the storage spring 11 intersects characteristic C4 at a stroke of about 42 mm and the spring force of 4,500 N available at that point would be below the necessary value of 4,800 N. It follows that a vehicle having a combined service-brake and spring-loaded brake cylinder 1 with the specified stroke of 40 mm should not be used in terrain with steep upward slopes and descents and that, after journeys in extreme conditions of use, the driver would have to actuate the service brake several times after cooling in order to readjust the brake. This is not acceptable, and it therefore follows that a storage spring 11 with a force/actuation path characteristic F2 should not be used in the spring-loaded brake cylinder 5.

As FIG. 2 makes clear, in the example described, the use in the spring-loaded brake cylinder 5 of a storage spring 11 with a force/actuation path characteristic F5, which produces an actuating force of 6,100 N for a parking brake function at the point of intersection with force/actuation path characteristic C4 at a stroke of 46 mm, appears suitable. Compared with a conventional 65 mm piston stroke of the spring-loaded brake cylinder 5, a shortening of 19 mm in overall length is advantageously obtained.

From the diagram in FIG. 2, it is apparent that "worst-case scenarios" corresponding to force/actuation path characteristic C4 should be taken into account in order to determine the minimum stroke of a storage spring 11 in the spring-loaded brake cylinder 5 so as to be able to ensure a minimum necessary parking brake force for safety reasons.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A method for producing a combined service-brake and spring-loaded brake cylinder for a brake system of a vehicle, the combined service brake and spring-loaded brake cylinder including a selected storage spring and the brake system including remaining brake actuating elements, the remaining brake actuating elements being actuatable by the selected storage spring, the method comprising:
    a) determining, in different operating states of the brake system, force-actuation path characteristics of the remaining brake actuating elements;
    b) determining force-actuation path characteristics of candidate storage springs for potential use in the spring-loaded brake cylinder;
    c) determining a minimum required actuating stroke of a piston of the spring-loaded brake cylinder and a minimum required spring force for effecting a parking brake function via the spring-loaded brake cylinder by ascertaining points of intersection of the force-actuation path characteristics of the remaining brake actuating elements with the force-actuation path characteristics of the candidate storage springs;
    d) selecting, as the selected storage spring, one of the candidate storage springs that produces an actuating force sufficient to effect, for at least one of the different operating states and a given maximum vehicle mass, the parking brake function with the smallest possible actuating stroke; and
    e) producing the combined service-brake and spring-loaded brake cylinder including the selected storage spring,
    wherein the combined service-brake and spring-loaded brake cylinder dimensions based at least in part on the smallest possible actuating stroke of the piston of the spring-loaded brake cylinder.

2. The method as claimed in claim 1, wherein determining, in different operating states of the brake system, force-actuation path characteristics of the remaining brake actuating elements comprises:
    (i) determining a force-actuation path characteristic for an operating state characterized by a cold brake system with new, run-in brake pads,
    (ii) determining a force-actuation path characteristic for an operating state characterized by a hot brake system resulting from intensive actuation of the service brake,
    (iii) determining a force-actuation path characteristic for an operating state characterized by a cooled brake system following intensive actuation of the service brake, the cooled brake system having been mechanically readjusted by actuation of the service brake, and
    (iv) determining a force-actuation path characteristic for an operating state characterized by a cooled brake system following intensive actuation of the service brake, the cooled brake system not having been mechanically readjusted.

3. The method as claimed in claim 1, wherein the force-actuation path characteristics of the candidate storage springs represent a spring force variation of the candidate storage springs over a stroke thereof, starting from an axially compressed state up to a predetermined maximum partially relaxed state.

* * * * *